Nov. 27, 1945.  F. H. HAGNER  2,389,852
AZIMUTH AND ALTITUDE MEASURING DEVICE
Filed April 19, 1943  2 Sheets-Sheet 1

Inventor
FREDERICK H. HAGNER
By
Attorney

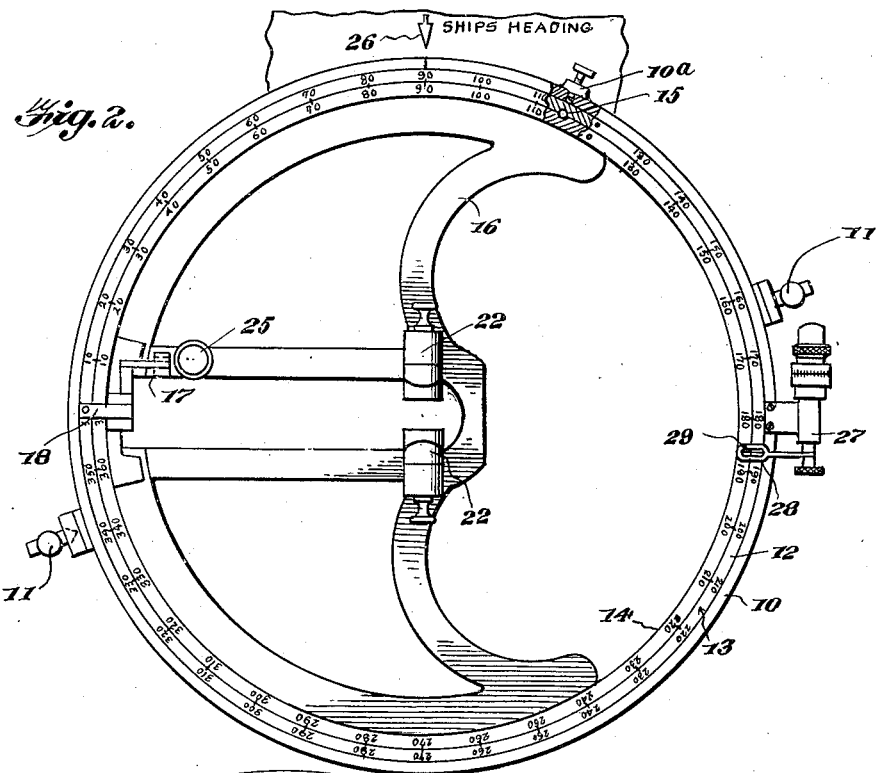
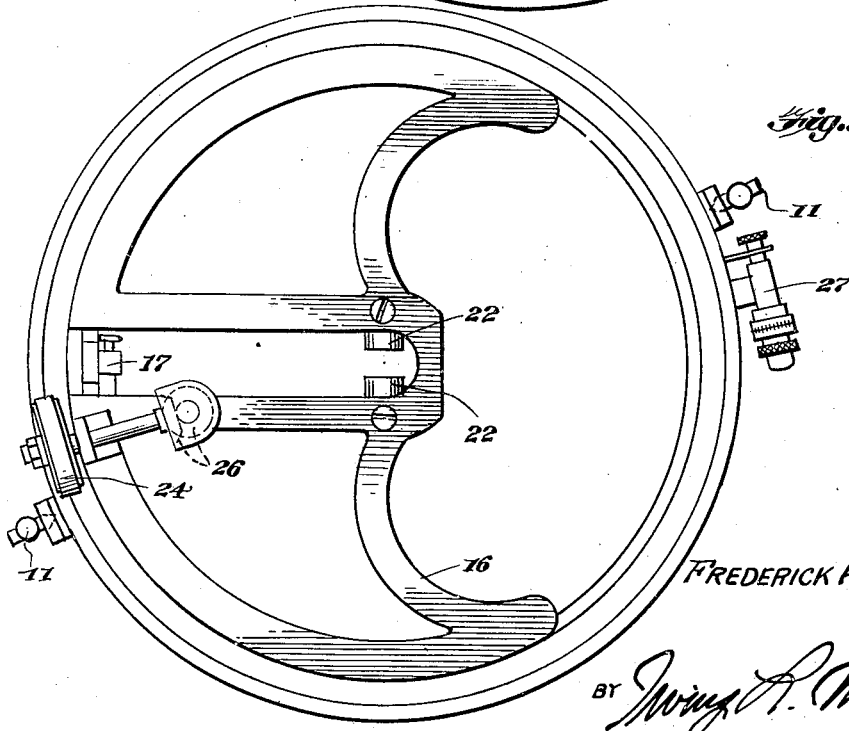

Patented Nov. 27, 1945

2,389,852

UNITED STATES PATENT OFFICE 2,389,852

AZIMUTH AND ALTITUDE MEASURING DEVICE

Frederick H. Hagner, San Antonio, Tex.

Application April 19, 1943, Serial No. 483,648

7 Claims. (Cl. 33—69)

This invention relates to an azimuth and altitude measuring device, and has for its object the production of a simple and efficient means for simultaneously measuring the azimuth or bearing of a celestial body and its altitude above the horizontal plane by direct observation.

Another object of this invention is the production of an azimuth and altitude measuring device which is especially constructed to facilitate direct observation or sounding of a balloon released for the purpose of determining the relative air currents aloft.

A further object of this invention is the production of an instrument especially constructed to suspend an observer in mid-air as a pendulum below the center of gravity of the instrument to counteract the unsteady movement of his support such as a ship and the like.

Other objects and advantages of the present invention will appear throughout the following specification and claims.

In the drawings:

Figure 2 is a bottom plan view with certain parts removed;

Figure 3 is a top plan view with certain parts removed.

Figure 1:
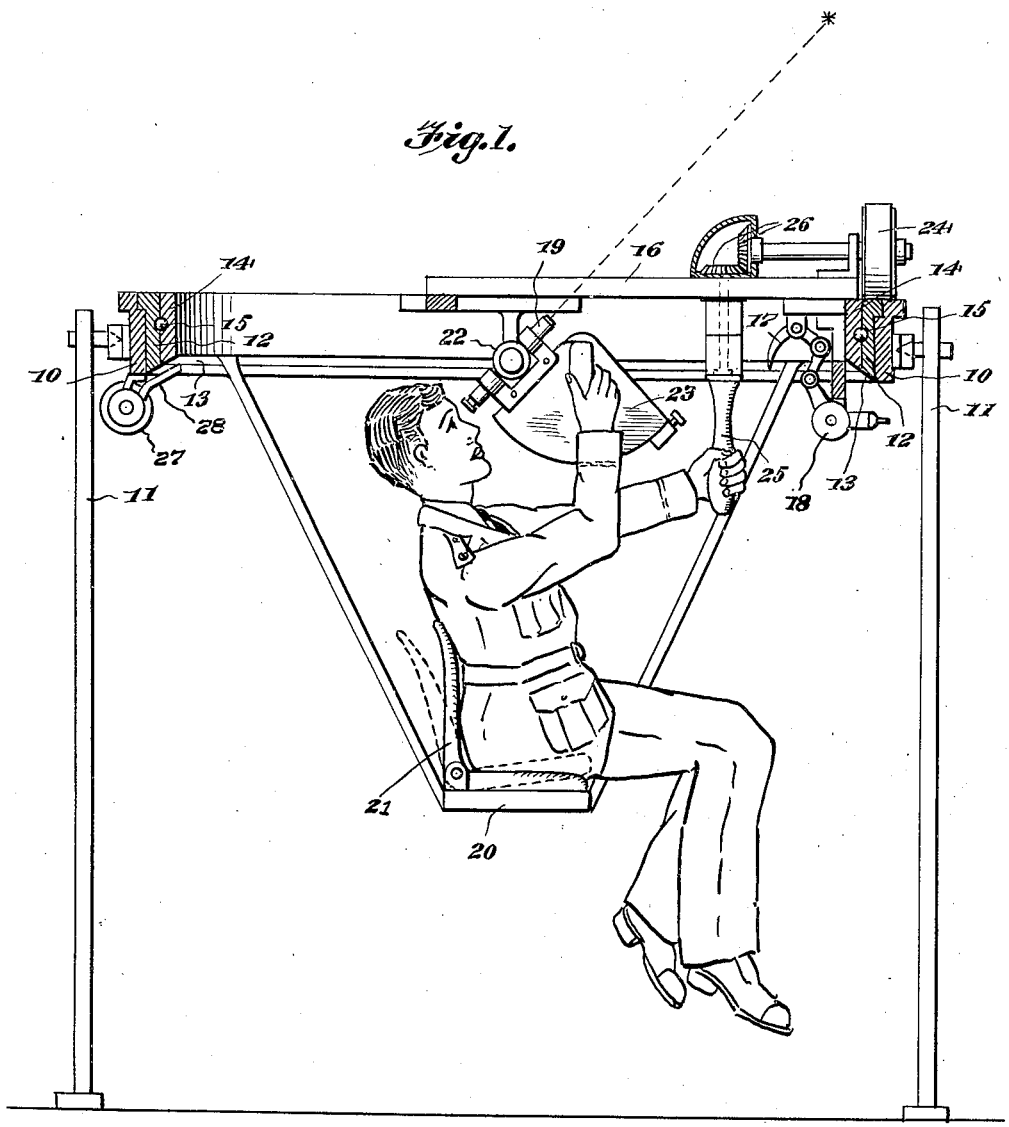
Figure 1 is a vertical sectional view of the measuring device.

This measuring device comprises a circular stationary frame 10 which is supported in an elevated position upon gimbals 11 in a suitable manner. A graduated rotatable band 12 is carried by the inner face of the frame 10. The band 12 is provided with a beveled under face 13, which beveled face 13 is graduated for 360° at 10° intervals. An inner ring 14 is carried by the inner face of the band 12 and is suspended upon ball-bearings 15 to facilitate the rotation of the ring 14 upon the band 12.

A skeleton platform 16 is carried by the ring 14, and a trigger 17 is suspended from this platform near the ring 14. This trigger 17 operates the marker 18 which is hung from the platform 16 in a position to be moved transversely across the inclined lower face of the band 12 for the purpose of marking upon this lower face the bearing at the time the observer has the observed object in line with the reference lines of the telescope 19 hereinafter described. The lower face of the rotating ring 14 is graduated 360° at 10° intervals, and the ring 14 rotates independently of the band 12.

A pendulum observing chair 20 is suspended from the inner ring 14 below the center of gravity of this ring 14. The seat and back 21 are preferably pivoted upon the chair as shown in Figure 1, so that the operator may freely adjust himself to conveniently view an object through the telescope 19. The telescope 19 is pivoted at the center of the skeleton platform 16 on two horizontal bearings 22, and forms a part of the sextant 23, as shown in Figure 1.

A friction wheel 24 rests upon the top edges of the frame 10 and the band 12 and is provided with a rubber tread to insure sufficient traction to rotate the inner ring 14 as the wheel 24 is rotated. This wheel 24 is rotated by means of a rotating depending grip 25 through the gears 26. This grip is suspended within easy reach of the observer, as shown in Figure 1. The frame 10 carries a set-screw or other locking means 10ª for engaging the outer band 12 and locking the band in a set relation at a proper degree which represents the true heading of the plane, ship, etc., for or at the time of observation. A suitable indicating means 26 is located at a selected point adjacent the measuring device representing the longitudinal axis of the ship.

A micrometer reading drum 27 is mounted upon the outside of the frame 10, and carries a reading glass 28 which underlies the scales formed upon the under faces of the band 12 and ring 14. This glass 28 has one etched line formed thereon for registration with any degree line 29 above it and carried by the band 12 or ring 14. The position of the line 29 of the glass 28 will normally overlie one of the degree lines of the scale on the ring 14, and after the observation has been made and the azimuth determined and the ring 14 is set, the line 29 may be brought in overlying position relative to the nearest degree line of the scale on ring 14 and the reading of the drum 27 represents the minutes of arc in addition to the degrees of the azimuth of the body observed.

For a series of intervals during the observation, while the operator has the instrument trained upon the object observed, he actuates the trigger 17 thereby making a series of marks upon the under face of the band 12. This enables an observer to visually approximate the middle point of these markings and obtain an average reading of the relative bearing or azimuth of the object being observed.

In navigating it is impossible to maintain an exact course at all times. With this means you record the variance in direction and the navigator having a visual pattern of the variance may determine the true bearing of the aziumuth of the body being observed.

Having described the invention, what is claimed is:

1. A device of the class described comprising a support, a frame having a circular track, a rotating element mounted for rotation on a normally vertical axis around said track, an operator-carrier suspended below and supported by said rotating element, the frame, rotating element and operator-carrier being pendulously hung upon said support, and a sextant mounted above said operator-carrier in line with the vertical axis of the center of gravity of said operator-carrier and within easy reach of an operator, in a manner whereby an operator while located upon said operator-carrier may view a selected celestial body through said sextant.

2. A device of the class described comprising a frame having a circular track, gimbals supporting said frame, a band mounted for rotating movement on and around said track on a normally vertical axis, means for locking said band in a rotated position, a ring, bearings supporting said ring upon the inner face of said band for free rotation thereabout, a seat suspended below and supported by said ring, the seat being arranged in line with the vertical axis through the approximate center of gravity of the ring, the seat, frame, band and ring being pendulously hung within said gimbals, and a sextant mounted on a horizontal pivot and located in line with the vertical axis of the center of gravity of the seat and within easy reach of an operator in a manner whereby an operator may sit upon the seat and may view a celestial body through said sextant.

3. A device of the class described comprising a frame having a circular track, gimbals supporting said frame, a band mounted for rotating movement on and around said track on a normally vertical axis, means for locking said band in a rotated position, a ring, bearings supporting said ring upon the inner face of said band for free rotation thereabout, a seat suspended below and supported by said ring, the seat being arranged in line with the vertical axis through the approximate center of gravity of the ring, the seat, frame, band and ring being pendulously hung within said gimbals, a sextant mounted on a horizontal pivot and located in line with the vertical axis of the center of gravity of the seat and within easy reach of an operator in a manner whereby an operator may sit upon the seat and may view a celestial body through said sextant, a graduated scale carried by said ring, a graduated scale carried by said band, and a marking device mounted adjacent said graduated scales upon the ring and band for marking a position upon the scale of the band to indicate the position of the scale on the ring relative to the scale on the band.

4. A device of the class described comprising a frame having a circular track, gimbals supporting said frame, a band mounted for rotating movement on and around said track on a normally vertical axis, means for locking said band in a rotated position, a ring, bearings supporting said ring upon the inner face of said band for free rotation thereabout, a seat suspended below and supported by said ring, the seat being arranged in line with the vertical axis through the approximate center of gravity of the ring, the seat, frame, band and ring being pendulously hung within said gimbals, a sextant mounted on a horizontal pivot and located in line with the vertical axis of the center of gravity of the seat and within easy reach of an operator in a manner whereby an operator may sit upon the seat and may view a celestial body through said sextant, a graduated scale carried by said ring, a graduated scale carried by said band, a marking device mounted adjacent said graduated scales upon the ring and band for marking a position upon the scale of the band to indicate the position of the scale on the ring relative to the scale on the band, said marking device comprising a pivoted marker adapted to move transversely across the graduated face of said band, and a trigger means for actuating said marker.

5. A device of the class described comprising a support, a frame having a circular track, a rotating element mounted for rotation on a normally vertical axis around said track, an operator-carrier suspended below and supported by said rotating element, the frame, rotating element and operator-carrier being pendulously hung upon said support, a sextant mounted above said operator-carrier in line with the vertical axis of the center of gravity of said operator-carrier and within easy reach of an operator in a manner whereby an operator while located upon said operator-carrier may view a selected celestial body through said sextant, and manually operated means engaging the frame and rotating element for moving the rotating element circumferentially of the track.

6. A device of the class described comprising a support, a frame having a circular track, a rotating element mounted for rotation on a normally vertical axis around said track, an operator-carrier suspended below and supported by said rotating element, the frame, rotating element and operator-carrier being pendulously hung upon said support, a sextant mounted above said operator-carrier in line with the vertical axis of the center of gravity of said operator-carrier and within easy reach of an operator in a manner whereby an operator while located upon said operator-carrier may view a selected celestial body through said sextant, manually operated means engaging the frame and rotating element for moving the rotating element circumferentially of the track, said manually operated means comprising an operating grip located within reach of an operator, a traction wheel overlying said track, and means connecting the traction wheel with the grip for facilitating the moving of the rotating element circumferentially of said track.

7. A device of the class described comprising a frame having a circular track, gimbals supporting said frame, a band mounted for rotating movement on and around said track on a normally vertical axis, means for locking said band in a rotated position, a ring, bearings supporting said ring upon the inner face of said band for free rotation thereabout, a seat suspended below and supported by said ring, the seat being arranged in line with the vertical axis through the approximate center of gravity of the ring, the seat, frame, band and ring being pendulously hung within said gimbals, a sextant mounted on a horizontal pivot and located in line with the vertical axis of the center of gravity of the seat and within easy reach of an operator in a manner whereby an operator may sit upon the seat and may view a celestial body through said sextant, graduated scales carried by the lower faces of said band and ring, a marking device supported adjacent the band for marking the position of the ring relative to said band upon said scales, a micrometer reading drum carried by the frame, and an index member carried by the drum and overlying the scales for facilitating the measurement of the minutes of arc in addition to the degrees of movement of the ring relative to said band.

FREDERICK H. HAGNER.